United States Patent

Upadhyay

[15] 3,675,503
[45] July 11, 1972

[54] CHAIN DRIVEN INDEXING GENEVA MECHANISM
[72] Inventor: Pravin M. Upadhyay, Phillipsburg, N.J.
[73] Assignee: Bell and Howell Company, Phillipsburg, N.J.
[22] Filed: Dec. 24, 1970
[21] Appl. No.: 101,303

[52] U.S. Cl. .................................74/436, 74/84, 74/820
[51] Int. Cl. ...............F16h 55/04, F16h 27/04, B23q 17/02
[58] Field of Search .............................74/436, 84, 820

[56] References Cited

UNITED STATES PATENTS 3,106,109  10/1963  Dexter ..................................74/436 X

*Primary Examiner*—Leonard H. Gerin
*Attorney*—Griffin, Branigan & Kindness

[57] ABSTRACT

A mechanism wherein a chain drive rotates a geneva wheel is disclosed. A plurality of roller bearings are mounted on the chain drive and coact with driving slots formed in the geneva wheel. A cam that periodically registers with indexing indentations formed in the geneva wheel for locking the geneva wheel in predetermined positions is also disclosed. The chain drive is moved by an arrangement of sprockets, one of which rotates about the same axis as does the geneva wheel. The cam is mounted on another of these sprockets and rotates therewith. The position of one of the sprockets relative to the other sprockets is adjustable so as to control tension on the chain drive.

17 Claims, 2 Drawing Figures

PATENTED JUL 11 1972　3,675,503

INVENTOR
PRAVIN M. UPADHYAY

BY Griffin, Branigan & Kindness

ATTORNEYS

CHAIN DRIVEN INDEXING GENEVA MECHANISM

BACKGROUND OF THE INVENTION

This invention generally relates to mechanical linkage systems and more particularly to mechanical linkage systems that include geneva wheels to provide intermittent movement.

It is often desirable in mechanical linkage systems to provide intermittent rotational movement. Frequently, intermittent mechanical movement is provided through the use of a geneva wheel which is a wheel that normally includes a plurality of radially extending slots that coact with a pin or finger mechanism that is moved by another part of the mechanical system. As the pin coacts with one of the driving slots, the geneva wheel is rotated through a predetermined arc. Thereafter, a second driving slot coacts with the pin mechanism to rotate the geneva wheel through a second arc. The geneva wheel "rests" between rotational movement periods. While prior art systems of this general nature are well known and widely used, they have certain undesirable features. For example, many prior art geneva wheel mechanical linkage systems are unduly complex and, therefore, expensive to manufacture and maintain in repair. In addition, conventional prior art geneva wheel mechanical linkage systems are limited to arcuate movement over arcs of less than 180°, usually a maximum of 120°.

Therefore, it is an object of this invention to provide a new and improved geneva wheel mechanical linkage system.

It is another object of this invention to provide a system for creating intermittent rotary motion which is not unduly complex and is, therefore, relatively inexpensive to manufacture and maintain in repair.

It is still another object of this invention to provide a geneva wheel mechanical linkage system for creating intermittent rotary shaft motion over arcs of either more or less than 180°.

SUMMARY OF THE INVENTION

In accordance with the principles of this invention an endless drive member is driven along a continuous path. The endless drive member has mounted thereon bearing rollers which register with the driving slots formed in a geneva wheel whereby movement of the endless drive member causes the geneva wheel to rotate in an intermittent manner. An indexing cam is mounted so as to periodically register with indexing indentations formed in the geneva wheel so as to lock the geneva wheel during periods of time when it is not being rotated.

It will be appreciated from the foregoing brief summary of the invention that a mechanical linkage system that includes a geneva wheel is provided. The system is relatively uncomplex, requiring relatively few elements. Yet, this uncomplex mechanism provides intermittent mechanical motion over arcs of greater or less than 180°. In addition, it prevents "play" in the system by locking the geneva wheel during rest periods.

BRIEF DESCRIPTION OF THE DRAWINGS

The foregoing and other objects, features and advantages of this invention will become more apparent from the following more particular description of a preferred embodiment of the invention which is illustrated in the accompanying drawings wherein.

DESCRIPTION OF THE PREFERRED EMBODIMENT

Figure 1:
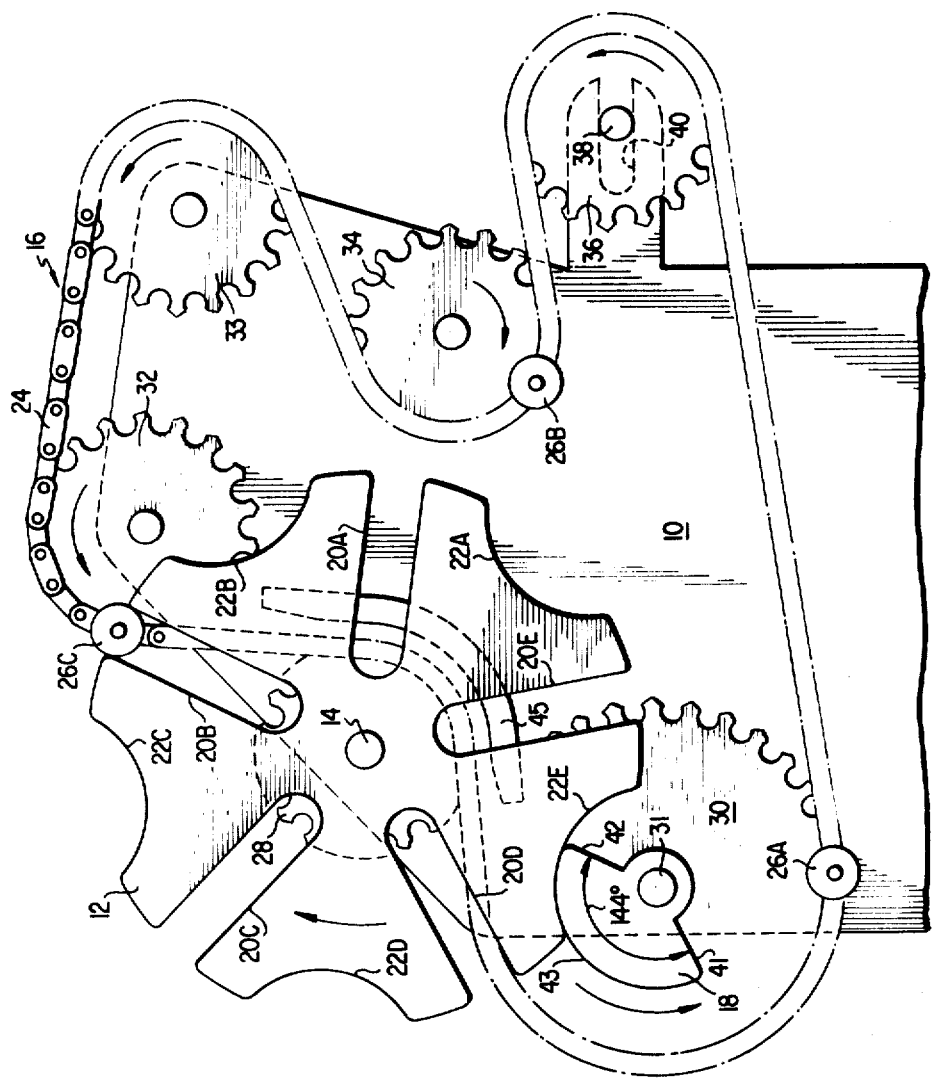
FIG. 1 is a side elevation of a geneva wheel mechanical linkage system formed in accordance with the invention; and, FIG. 2 is an enlarged view of a roller bearing mounted on a chain and suitable for use in the embodiment of the invention illustrated in FIG. 1.

FIG. 1 illustrates a geneva wheel mechanical linkage system mounted on a frame 10. The geneva wheel mechanical linkage system comprises a geneva wheel 12, a chain drive mechanism 16 and an indexing cam 18. The geneva wheel 12 has five radially extending driving slots 20A-E spaced 72° apart and five semi-circular shaped indexing indentations 22A-E formed therein. The five semi-circular shaped indexing indentations 22A-E are formed in the outer periphery of the geneva wheel 12 between the five radially extending driving slots 20A-E. The chain drive mechanism 16 comprises a chain 24, three indexing elements 26A-C, and an arrangement of sprockets which cause the chain 24 to move in a predetermined path.

The geneva wheel 12 is rotatably mounted on a geneva wheel axle 14. Also mounted on the geneva wheel axle is a geneva wheel sprocket 28 which is one of the arrangement of sprockets forming a portion of the chain drive mechanism 16. The geneva wheel sprocket 28 rotates independently of the geneva wheel 12. The geneva wheel sprocket 28 is significant in that it is this sprocket which makes possible intermittent geneva motion of greater than 180° as is explained below.

Mounted in juxtaposition with respect to the geneva wheel is an inserting sprocket 32. The inserting sprocket is also one of the arrangement of sprockets forming a part of the chain drive mechanism 16. As hereinafter explained, the inserting sprocket 32 inserts the indexing elements 26A-C (which are attached to the chain 24) in the driving slots 20A-E.

A withdrawing sprocket 30 that rotates about a cam axle 31, has the indexing cam 18 fixedly attached thereto so that the indexing cam 18 rotates as the withdrawing sprocket 30 rotates. In the illustrated embodiment, the indexing cam 18 has an angular width of 144°; the significance of this width will be explained below. The indexing cam 18 has a leading edge 41, a trailing edge 42 and a face 43. The withdrawing sprocket 30 is positioned in juxtaposition with regard to the geneva wheel so that the indexing cam 18 registers with the indexing indentations 22A-E in the geneva wheel 12 as hereinafter explained. Moreover, the withdrawing sprocket 30 is driven by a power source (not shown) whereby it is the driving force for the chain 24. In a preferred embodiment of the invention, the withdrawing sprocket has 30 teeth at a three-eighths of an inch pitch and the inserting sprocket has 20 teeth at a three-eighths of an inch pitch.

The sprocket arrangement is completed by two stationary idler sprockets 33 and 34 and an adjustable idler sprocket 36. The position of the axle 38 on which the adjustable idler sprocket is mounted can be adjusted by moving it back and forth in a slot 40 formed in the frame 10. This adjustment provides for loosening and tightening of the chain 24. Also illustrated in FIG. 1 is a cam track 45. The cam track 45 is generally semi-circular and is attached to the frame 10 between the frame 10 and the geneva wheel 12. The cam track generally follows the curve of the geneva wheel sprocket 28 along the path of the chain 24 between the inserting sprocket 32 and the withdrawing sprocket 30.

In the preferred embodiment of the invention referred to above, the chain 24 is a A.S.A. No. 35 Chain and has a total of 29 links. The three indexing elements 26A-C are mounted on the chain and are equally spaced from each other.

Figure 2:
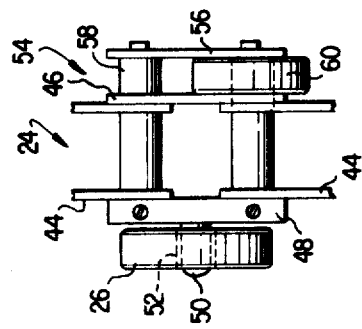

The manner in which the indexing elements 26A-C are attached to the chain 24 is illustrated in detail in FIG. 2. FIG. 2 illustrates an indexing element 26 mounted on two links 44, 44 of the chain 24. The links 44, 44 are held together at one side by a chain link plate 46 and on the other side by a special mounting link-joining member 48. An axis pin 50, which is an integral part of the special mounting link-joining member 48, extends outwardly from that member. The indexing element 26 is illustrated as mounted on the axis pin 50. Ball bearings 52 are located between the axis pin 50 and the indexing element 26. The indexing elements 26 are of appropriate size so that they will fit into the driving slots 20A-E formed in the geneva wheel 12. In an unillustrated embodiment of this invention simple engaging pins are used rather than indexing elements that include ball bearings.

Also illustrated in FIG. 2 on the opposite side of the chain 24 from the indexing elements is a roller bearing arrangement 54. The roller bearing arrangement includes a chain link 56 separated from the chain link plate 46. A separating cylindrical element 58 separates one side of the chain link 56 from the chain link plate 46 and a roller bearing 60 separates the other side of the chain link from the chain link plate. The outer diameter of the roller bearing 60 is greater than the widths of the chain link plate and the chain link. A roller bearing arrangement of this nature is located between each pair of links 44, 44 of the entire chain, just between links adjacent to the indexing elements. The roller bearings 60 of the roller bearing arrangements 54 impinge and roll on the cam track 45 as the chain 24 moves through its path of travel.

As illustrated in FIG. 1, the chain 24 moves along a continuous path which is defined by the sprocket arrangement. As previously stated an outside power source (not shown) moves the chain along this path by driving the withdrawing sprocket 30.

Turning now to a description of the operation of the invention, when the geneva wheel mechanical linkage system is in the position illustrated in FIG. 1, the indexing cam 18 is in registration with one of the indexing indentations 22E. In the position shown, the geneva wheel is going from a "locked" position to an "unlocked" position. Thus, the geneva wheel is actually unlocked before the indexing cam 18 is withdrawn from the indexing indentation 22E. Prior to reaching this position, indexing element 26A was in the geneva wheel slot 20D. As the geneva wheel reached the position illustrated in FIG. 1, indexing element 26A was withdrawn from the particular driving slot 20D. At this point the cam 18 started to coact with the indexing indentation 22E. This action prevented further movement of the geneva wheel whereby it was locked in the position shown in FIG. 1. It should be noted that the leading edge 41 of the indexing cam 18 was actually inserted in the indexing indentation 22E before the face 43 of the indexing cam 18 made contact with the surface of the indexing indentation 22E.

During this "lock" position of the geneva wheel, indexing element 26C, illustrated in the upper portion of FIG. 1, was inserted into another of the driving slots 20B by the inserting sprocket 32. As the trailing edge 42 of the indexing cam 18 reaches the position shown in FIG. 1, indexing element 26C begins to urge the geneva wheel 12 to rotate in a clockwise direction. This occurs because at this point the indexing cam 18 releases indexing indentation 22E and indexing element 26C pushes on one side of driving slot 20B. Eventually, driving slot 20B will reach the position of slot 20D and at this point the withdrawing sprocket 30 will begin to withdraw indexing element 26C from slot 20B. At this same time, the face 43 of indexing cam 18 will again make contact with an indexing indentation, in this case indexing indentation 22C, and the geneva wheel will be held stationary until the trailing edge 42 of the indexing cam 18 again releases the indexing indentation 22C.

Thus, the geneva wheel is alternately rotated by the indexing elements 26 and then held stationary in a locked position by the indexing cam 18. In the illustrated embodiment, each time the geneva wheel rotates, it rotates through an angle of 216° out of a possible 360° cycle. It then remains stationary for a period of time representative of 144° of the same 360° cycle. In this regard, it is significant that the indexing cam 18 also has an angular width of 144°. A "period" of revolution of the geneva wheel 12 is the same as the "period" of revolution of the indexing cam 18; that is, each time the geneva wheel rotates through an angle of 216° and rests for a period of time representative of 144°, the indexing cam 18 rotates once.

It should be noted that because the Geneva wheel sprocket 28 rotates about the same axis as does the geneva wheel 12, the geneva wheel can be rotated through angles greater than 180° as shown. This arrangement is of particular significance because if the chain 24 were straight between the inserting sprocket 32 and the withdrawing sprocket 30, each roller bearing could only rotate the geneva wheel through an angle of less than 180°. Hence, geneva wheel movement angles of greater or less than 180° are covered by the invention.

It will be appreciated by those skilled in the art and others that only a preferred embodiment of the invention has been illustrated and described. While five driving slots and five indexing indentations have been illustrated, greater or lesser numbers could also be used. Moreover, more than three indexing elements could be mounted on a continuously driven chain. Hence, while the invention has been particularly shown and described with reference to a preferred embodiment, it should be understood by those skilled in the art that various changes in form and detail may be made therein without departing from the spirit and scope of the invention. Consequently, the invention can be practiced other wise than as specifically described herein.

The embodiments of the invention in which an exclusive property or privilege is claimed are defined as follows:

1. An intermittent drive system comprising:
   a geneva wheel having indexing indentations therein;
   an operating means for intermittently driving said geneva wheel through a predetermined angle that is greater than 180°; and,
   a cam for registering with said indexing indentations during periods when said operating means is not driving said geneva wheel and thereby locking said geneva wheel in a stationary position.

2. An intermittent drive system as claimed in claim 1 wherein said geneva wheel has driving slots and said operating means comprises:
   an endless driving member;
   a driving means for causing said endless driving member to move continuously along a path; and,
   indexing elements mounted on said endless driving member for periodically registering with said driving slots and thereby causing said geneva wheel to rotate.

3. An intermittent drive system as claimed in claim 2 wherein said cam is linked to said driving means.

4. An intermittent drive system as claimed in claim 3 wherein said driving means comprises a plurality of wheels, at least one being driven by an outside force; and wherein said cam means is mounted on one of said wheels.

5. An intermittent drive system as claimed in claim 4 wherein said cam and said indexing indentations have similar semi-circular shapes.

6. An intermittent drive system as claimed in claim 5 wherein one of said wheels rotates about the same axis as said geneva wheel.

7. An intermittent drive system as claimed in claim 6 wherein the position of one of said wheels relative to the other wheels is adjustable.

8. An intermittent drive system as claimed in claim 7 wherein said endless member is a chain and said wheels are sprockets.

9. An intermittent drive system as claimed in claim 8 wherein:
   each indexing element, upon registering with a drive slot, causes said driven wheel to rotate through the predetermined angle of $\beta$; and,
   said cam has an angular width of $\theta$, which when added to $\beta$ results in a sum of 360°.

10. An intermittent drive system as claimed in claim 1 wherein said cam means is mounted on one of said wheels and wherein said cam means and said indexing indentations have similar semi-circular shapes.

11. An intermittent drive system as claimed in claim 10 wherein:
    said predetermined angle is $\beta$; and,
    said cam has an angular width of $\theta$, which when added to $\beta$ results in a sum of 360°.

12. An intermittent drive system as claimed in claim 11 wherein said geneva wheel has driving slots and said operating means comprises:
    an endless driving member;
    a driving means, including a plurality of wheels, for causing said endless driving member to move continuously along a path; and indexing elements mounted on said endless driving member for periodically registering with said driving slots and thereby causing said geneva wheel to rotate.

13. A geneva drive system comprising:
a geneva wheel adapted for rotating about an axis and having driving slots formed therein;
an endless driving member;
indexing elements mounted on said endless driving member; and,
a driving means for causing said endless driving member to move continuously along such a path as to cause said indexing elements to periodically register with said driving slots and thereby cause said geneva wheel to intermittently rotate through a predetermined angle greater than 180° but less than 360°.

14. A geneva drive system as claimed in claim 13 wherein said driving means comprises an arrangement of wheels including at least one wheel which rotates about the same axis as geneva wheel.

15. A geneva drive system as claimed in claim 14 wherein said geneva wheel has indexing indentations therein, said system further comprising a cam for registering with said indexing indentations during periods when said driving means is not driving said geneva wheel and thereby locking said geneva wheel in a stationary position.

16. A geneva drive system as claimed in claim 15 wherein said cam means and said indexing indentations have complementary semi-circular shapes.

17. A geneva drive system as claimed in claim 16 wherein:
said predetermined angle is $\beta$; and,
said cam has an angular width of $\theta$, which when added to $\beta$, results in a sum of 360°.

* * * * *